(12) United States Patent
Dalton et al.

(10) Patent No.: US 12,320,685 B2
(45) Date of Patent: Jun. 3, 2025

(54) APPARATUS FOR USE IN MEASURING A PROPERTY OF A FLUID AND METHOD

(71) Applicant: University of Limerick, Limerick (IE)

(72) Inventors: Eric Dalton, Limerick (IE); Valeria Nico, Limerick (IE)

(73) Assignee: UNIVERSITY OF LIMERICK, Limerick (IE)

(\*) Notice: Subject to any disclaimer, the term of this patent is extended or adjusted under 35 U.S.C. 154(b) by 140 days.

(21) Appl. No.: 17/904,337

(22) PCT Filed: Feb. 19, 2021

(86) PCT No.: PCT/EP2021/054133
§ 371 (c)(1),
(2) Date: Aug. 16, 2022

(87) PCT Pub. No.: WO2021/165460
PCT Pub. Date: Aug. 26, 2021

(65) Prior Publication Data
US 2024/0027241 A1    Jan. 25, 2024

(30) Foreign Application Priority Data
Feb. 21, 2020 (GB) ........................... 2002485

(51) Int. Cl.
*G01F 1/24* (2006.01)
*G01F 1/58* (2006.01)

(52) U.S. Cl.
CPC . *G01F 1/24* (2013.01); *G01F 1/58* (2013.01)

(58) Field of Classification Search
CPC ..................................... G01F 1/24; G01F 1/58
See application file for complete search history.

(56) References Cited

U.S. PATENT DOCUMENTS 3,406,569 A * 10/1968 Rohmann ............... G01F 1/586
73/861.12
6,339,959 B1 * 1/2002 Natapov ................... G01F 1/28
73/239

(Continued)

FOREIGN PATENT DOCUMENTS

| DE | 823797 C | 12/1951 |
|---|---|---|
| JP | H1038644 A | 2/1998 |
| WO | 2021165460 A1 | 8/2021 |

OTHER PUBLICATIONS

Translation of DE823797.*

(Continued)

*Primary Examiner* — Helen C Kwok
(74) *Attorney, Agent, or Firm* — Hamilton, Brook, Smith & Reynolds, P.C.

(57) ABSTRACT

An apparatus for use in measuring a property of a fluid and a method of measuring a property of a fluid in a conduit. The apparatus is for use in measuring a property of a fluid, the apparatus comprising: a conduit comprising an inlet through which fluid can enter the conduit; a movable member retained within the conduit, the movable member configured to move in accordance with the property of the fluid in the conduit; and a magnetic field generating unit for generating one or more magnetic fields in the conduit, an interaction between the movable member and the one or more magnetic fields being detectable via the magnetic field generating unit, to measure the property.

16 Claims, 4 Drawing Sheets

(56) References Cited

U.S. PATENT DOCUMENTS

| | | | | |
|---|---|---|---|---|
| 2004/0045368 A1* | 3/2004 | Schoeb | ............... | G01F 1/28 |
| | | | | 73/861.08 |
| 2014/0260587 A1* | 9/2014 | Maute | ............... | E21B 47/113 |
| | | | | 73/152.29 |
| 2018/0335373 A1* | 11/2018 | Graichen | ............ | A61M 60/816 |
| 2018/0372523 A1* | 12/2018 | Alkhabbaz | ............... | G01F 1/24 |
| 2019/0301904 A1* | 10/2019 | Alkhabbaz | ............. | G01N 27/10 |
| 2020/0025188 A1* | 1/2020 | Dalton | ............... | F04B 19/006 |
| 2020/0080876 A1* | 3/2020 | Mazumdar | ........ | G01R 33/34061 |
| 2020/0217698 A1* | 7/2020 | Ciobanu | ............... | G01F 1/586 |
| 2021/0396556 A1* | 12/2021 | Dasgupta | ............... | G01F 1/588 |

OTHER PUBLICATIONS

Great Britain Search Report for Application No. GB2002485.7, Date of Search: Jan. 13, 2021.

International Search Report for Application No. PCT/EP2021/054133, Title "Apparatus For Use in Measuring a Property of a Fluid and Method," Date of Mailing: Oct. 5, 2021.

Written Opinion of the International Searching Authority of Application No. PCT/EP2021/054133, Title "Apparatus For Use in Measuring a Property of a Fluid And Method," Date of Mailing: Oct. 5, 2021.

\* cited by examiner

APPARATUS FOR USE IN MEASURING A PROPERTY OF A FLUID AND METHOD

This application is the U.S. National Stage of International Application No. PCT/EP2021/054133, filed Feb. 19, 2021, which designates the U.S., published in English, and claims priority under 35 U.S.C. § 119 or 365 (c) to GB Application No. 2002485.7, filed Feb. 21, 2020. The entire teachings of the above applications are incorporated herein by reference.

The present invention is directed towards apparatus for use in measuring a property of a fluid. More specifically, the present invention is directed towards flowmeters, in particular electromagnetic flowmeters.

BACKGROUND

Flowmeters are used to quantify fluid movement. Flowmeters can be used to measure linear, nonlinear, volumetric or mass flow rate of a fluid. Current commercially available flowmeters include the following types: obstruction type (differential pressure or variable area); inferential (turbine type); electromagnetic; mass flowmeters (based on the Coriolis effect) and those based on thermal properties of component materials.

Known electromagnetic flowmeters measure fluid flow by applying a magnetic field to a fluid flowing through the flowmeter and measuring the voltage induced. The induced voltage is proportional to the fluid flow velocity perpendicular to the magnetic flux lines through the flowmeter metering tube.

Whilst electromagnetic flow measurement has been successfully applied in the field, commercially available electromagnetic flowmeters are bulky and are difficult to install and calibrate. They are also slow to respond to perturbations in the fluid flow, such as the presence of air pockets and bubbles, or the propagation of pressure waves. Furthermore, electromagnetic flowmeters require a conducting fluid, for example, water that contains ions, and an electrically insulating pipe surface, such as a rubber-lined steel tube. Commercially available electromagnetic flowmeters are complex and expensive instruments.

In a proposed electromagnetic flowmeter, a ferromagnetic wire is attached to an outer surface of a Bourdon tube pressure gauge. Movement of the tube under applied pressure results in movement of the wire. Movement of the wire into and out of an inductive pickup coil changes the self-inductance of the coil. The pressure in the Bourdon tube can be determined by monitoring the self-inductance of the coil. However, such a flowmeter would be difficult to calibrate. Furthermore, Bourdon tubes have many disadvantages. Such a flowmeter would be bulky and would be slow to respond to flow changes, as fluid flow is measured indirectly from an outer surface of the tube.

It is an object of the present invention to provide an improved apparatus for use in measuring a property of a fluid and/or to address one or more of the problems discussed above, or discussed elsewhere, or to at least provide an alternative apparatus.

SUMMARY OF THE INVENTION

According to the present invention there is provided an apparatus for use in measuring a property of a fluid and a method of measuring a property of a fluid in a conduit, as set forth in the appended claims. Other features of the invention will be apparent from the dependent claims, and the description which follows.

According to a first aspect of the present invention there is provided an apparatus for use in measuring a property of a fluid, the apparatus comprising: a conduit comprising an inlet through which fluid can enter the conduit; a movable member retained within the conduit, the movable member configured to move in accordance with the property of the fluid in the conduit; and a magnetic field generating unit for generating one or more magnetic fields in the conduit, an interaction between the movable member and the one or more magnetic fields being detectable via the magnetic field generating unit, to measure the property.

Such a construction is advantageous for numerous reasons. The apparatus does not require a large space in which to be installed because the apparatus can be constructed about the conduit into which fluid is allows to enter via the inlet. The apparatus need only require an inlet, and not an outlet, in order to determine instantaneous fluid flow. Providing a moveable member in the conduit configured to move in accordance with the fluid in the conduit provides for direct measurement of fluid properties, and thus accurate measurement. The apparatus is more sensitive to, and quick to respond to, perturbations or changes in the fluid flow because the moveable member moves in direct response to flow changes.

Because the moveable member interacts with the magnetic field, the fluid itself need not be a conducting fluid, as in known electromagnetic flowmeters. That is, the moveable member interacts with the magnetic field in the conduit, eliminating the need for conducting fluid. This approach also means that magnetic material does not need to be dispersed in the fluid, for example to make it "artificially" magnetic. This might make any experimentation simpler or might reduce limitations on the types of fluids to be monitored. The apparatus is reliable as it comprises few moving parts, in particular, a single moveable member.

In examples, the property of the fluid is flow rate, flow speed, pressure, or any other property of the fluid, which may be a kinetic property (that is, related to movement of the fluid, which includes a pressure wave in the fluid). Configured to move may mean configured to move "through the conduit". The apparatus may be referred to as a flowmeter, or as an electromagnetic flowmeter.

In one example, the conduit comprises an outlet through which fluid can exit the conduit.

Advantageously, this allows the apparatus to be placed in line. In line installation is simple and does not require diverting flow away from the fluid flow line of interest, for example via a branch or tap line. Measurements of the fluid properties are more accurate where the apparatus is installed in line. Calibration of the apparatus is simpler where the apparatus is placed in line as there is a direct and more intelligible correlation between fluid flow property and the output from the apparatus. Whilst measuring in line is advantageous, some existing apparatus can cause the fluid pressure to drop, and this pressure must be subsequently rebuilt later in the flow line. Pressure drop across the present apparatus is low as the flow path need not be greatly constricted in order to cause the moveable member to move.

In one example, the moveable member comprises a magnetic material.

In general, any material which interacts with the one or more magnetic fields is suitable for use with the present invention, provided that the interaction is detectable via the magnetic field generating unit. Advantageously, magnetic materials have a high magnetic permeability, which means that they interact strongly with a magnetic field in which they are placed. The moveable member comprising a magnetic material means that the location or movement or the moveable member is easier to detect via the magnetic field generating unit because of the strong interaction of the magnetic material with the magnetic field. In one example, the magnetic material may be iron or ferrite.

In one example, the moveable member comprises a passageway extending therethrough for facilitating a fluid flow through the moveable member.

In general, the moveable member need not comprise a passageway, and could instead be a float, or smaller than the conduit in which it is retained. Fluid would therefore flow around the moveable member, whilst causing it to move. Advantageously, by providing a passageway, a robust construction is facilitated in which the moveable member is sized to be slidable received in the conduit in a substantially constant orientation, and flow is allowed through the member itself. For instance, the member might extend all the way across, and generally fill, the conduit, with the passageway still allowing measurements to take place, and fluid to flow. Moreover, the passageway can be sized appropriately for the type of measurement required, for example, a larger passageway for a higher flow rate of interest. The construction of the apparatus need not be otherwise modified to achieve this. In particular, the overall apparatus size need not be increased.

In one example, the property of the fluid is determined by measuring an electrical property of the magnetic field generating unit. In one example, the electrical property is voltage. In another example, the electrical property is inductance. Inductance may be indirectly determined by measuring voltage.

Advantageously, the interaction of the moveable member with the magnetic field has an effect on the electrical property of the magnetic field generating unit, and thus measuring the electrical property allows the position or movement of the member to be determined, and thus properties of the fluid. In one example, a voltage is induced by movement of a magnetic member through the magnetic field, and in another example, a voltage is induced by a changing current in the magnetic field unit, the level of which is dependent on the location of the moveable member.

In one example, the magnetic field generating unit is supplied with an alternating electric current.

Advantageously, alternating electric current can be provided by a low power driver. A simple driving and measuring circuit is thereby provided. The alternating electric current can cause a change in the direction of the magnetic field generated by the magnetic field generating unit. A direct electric current allows movement of the moveable member to be determined, as the movement would be detectable as a change in electrical property of the magnetic field generating unit. Advantageously, an alternating electric current allows the position of the moveable member to be determined when the moveable member is stationary.

In one example, the conduit comprises an axis along which the movable member is configured to move, and the magnetic field generating unit comprises one or more coils surrounding the axis.

Advantageously, coils can be used to generate a strong magnetic field because of magnetic flux line linkage. The magnetic field that is set up by the coil has field lines which extends through the centre of the coil. Surrounding the axis with the coils creates a strong, potentially uniform, field within the conduit. Coils also have a small profile and can be arranged to lie close to or on an outer surface of the conduit, or even embedded in the conduit wall. This advantageously helps to ensure that the profile of the apparatus is small. Coils surrounding the axis may mean that a coil is provided around, or coiled around, the axis. That is, the axis of the coil may be coaxial with the axis of the conduit, and/or the moveable member in that conduit.

In one example, the magnetic field generating unit comprises a first coil portion and a second coil portion. In one example, a coil portion is a portion of a single, longer, coil. That is, a first coil portion may be a portion of a first coil, and a second coil portion may be a portion of the same first coil. In another example, a coil portion is a separate coil. That is, a "first coil portion" may be used to refer to a first coil, and a "second coil portion" may be used to refer to a second coil. Where the coil portions are separate coils, the terms "first coil" and "second coil" may be used. The distinction between the coil portions being part of the same coil or being different coils may be the result of a region of uncoiled wire defining a "gap" or separation between the coil portions. Advantageously, the signal from the two coil portions can be compared to provide better detection resolution. Where the coil portions are portions of a single coil, the apparatus may need to have enhanced sensitivity when compared with the example in which the coil portions are each a separate coil. Nevertheless, both examples advantageously allow for the movement of the moveable member to be detected and accurately monitored. The example in which the coil portions are each a separate coil may still provide a clear indication of the movement of the moveable member when a simple, low sensitivity, monitoring system is employed, by virtue of the separated magnetic fields generated by the separated coils. Differential amplification can be used to amplify small changes in the electrical properties between the two coil portions. Moreover, providing a second coil portion would advantageously not necessarily increase the size of the apparatus, as the moveable member may need to move away from the first coil portion regardless for the change in electrical property to be detected. That is, instead of providing a coil-free region to which the moveable member could move, the provision of a second coil portion in that region is actually beneficial.

In one example, each coil portion has a length, and the coil portions are spatially separated along an axis through the conduit such that the length of each coil portion is spatially separated. Advantageously, this separates the magnetic fields, making the interaction easier to distinguish when the apparatus is in operation. Furthermore, a greater range of motion of the moveable member is monitorable.

In one example, the first coil portion and second coil portion are connected in series, and the electrical property of the magnetic field generating unit is measured from between the first coil portion and second coil portion. This facilitates a simple driving and measuring circuit. The electronics are thus robust and reliable.

In one example, the movable member is movable away from the first coil portion and simultaneously toward the second coil portion. The first coil portion can therefore be used as a reference signal, and movement away from the first coil portion and into the second coil portion can be detected as a response of the second coil portion to the moveable member moving toward it. Again, differential amplification can be used to amplify the difference. Furthermore, as the moveable member moves away from the first coil portion and simultaneously toward the second coil portion, there will be a corresponding relationship between the signals from each of the two coil portions.

In one example, when the fluid property is at or below a first level, the movable member is entirely within one of the first coil portion and second coil portion. Advantageously, this provides for an equilibrium, or rest position. A threshold of the fluid property can therefore be measured as a change in the electrical property as the moveable member moves out of the one coil portion. When the moveable member is entirely within the one coil portion, it may not interact strongly with the magnetic field of the other coil portion. This is advantageous as the location of the moveable member can be clearly determined as a large difference in the electrical property measured across each coil portion.

In one example, the conduit comprises a first end and a second end, and the apparatus further comprises one or more biasing members for urging the moveable member away from one or both of the ends of the conduit, the biasing member optionally comprising one or more magnetic members.

In one example, the first end is the inlet end, and the second end is the outlet end. In one example, the biasing members are for urging the moveable member away from the second end and toward the first end. Such a construction is advantageous as the biasing members can be arranged to urge the moveable member into a rest position. In an advantageous example, this occurs when there is no fluid flow through the conduit. A reference signal is therefore obtainable by providing no fluid flow to the apparatus and detecting the interaction between the member and the magnetic field. A change of location of the moveable member can be observed as a deviation from the reference signal.

In another example, the biasing members are arranged to urge the moveable member away from both the first end and second end. That is, one biasing member may be provided at each end of the conduit. By appropriate selection of biasing members, the rest position can be configured to be a position between the first coil portion and second coil portion along the axis of the conduit. The moveable member may partially overlap both coil portions. Flow in either direction along the conduit will cause a change of location of the moveable member from the rest position, which will be observable as a deviation from the reference signal. Bi-directional measurement is thus advantageously facilitated. The biasing members could be springs or similar, but one or more magnets may be preferred. Magnets will operate in a non-contact manner, and this might assist with durability, reliability and consistency of use of the overall apparatus.

Furthermore, the use of magnetic bias advantageously allows the flowmeter to be useable in both a vertical orientation, and in non-vertical orientations, for example in a horizontal orientation, or at an angle to the horizontal. This is because the magnetic biasing force will always allow the moveable member to return to the rest (or "zero-flow") position. Magnetic biasing due to the incorporation of magnetic biasing members does not rely on the effect of gravity to return the moveable member to a rest position.

In a construction wherein magnetic biasing members are provided at each end of the conduit, and at each end of the moveable member, as described above, the flowmeter is bidirectional. Appropriate selection of the magnetic strength enables the rest (or "zero-flow") position to be centrally located, or substantially centrally located, in the conduit. As will be understood by the skilled person from the present disclosure, the voltage measured on the second coil will increase or decrease depending on the direction of the flow.

Additionally, use of magnets as biasing members simplifies scaling of volume of the flowmeter, especially compared with the use of a spring bias. For example, in a smaller, more compact flowmeter, smaller and weaker magnets are readily available for such applications.

Advantageously, the dynamic range of the core is extended compared to an arrangement wherein the moveable member is a floating member, or is a spring-loaded member. Magnetic force has a $1/d^4$ proportionality, where d is the distance between magnetic biasing members. Consequently, the moveable member is moveable even at low flow rates because the magnetic force resisting motion is low. In this way, the flowmeter is sensitive to low flow rates. Where the flow rate is increased, the moveable member can be forced closer to the magnet at the second end, which may be the outlet end. The moveable member is acted on by the resistive magnetic force, and in this way, high flowrate measurement can be performed.

As explained above, depending on the magnetic bias, the flowmeter is operable to measure low flowrates or high flowrates. With a low magnetic bias, the moveable member does not experience the magnetic force until close to the ends of the conduit, and hence is sensitive to low flowrates. With a high magnetic bias, the moveable member experiences the magnetic force in a central, or substantially central region of the conduit, away from the ends, and hence the flow meter can be used to measure and monitor high flowrates as the moveable member is maintained centrally despite the high flow through the flowmeter.

According to a second aspect of the present invention there is provided a method of measuring a property of a fluid in a conduit, the conduit retaining a moveable member configured to move in accordance with the property of the fluid, the method comprising: generating one or more magnetic fields in the conduit; exposing the movable member to the fluid; and detecting an interaction between the moveable member and the one or more magnetic fields, to measure the property.

The method of the second aspect of the present invention may comprise any or all of the features of the first aspect of the present invention, as desired or as appropriate.

Such a method provides a method of measurement in which the moveable member is caused to move under direct influence of the fluid, the movement being indicative of a property of the fluid, for example flow rate. The movement of the moveable member is then detectable by detecting the interaction between the moveable member and the one or more magnetic fields. This provides for a simple and robust method of measuring properties of a fluid in a conduit.

Various combinations of optional features have been described herein, and it will be appreciated that described features may be combined in any suitable combination. In particular, the features of any one example embodiment may be combined with features of any other embodiment, as appropriate, expect where such combinations are mutually exclusive. Throughout this specification, the term "comprising" or "comprises" means including the component(s) specified but not to the exclusion of the presence of others. Other features of the invention will be apparent from the dependent claims, and the description which follows.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 1:
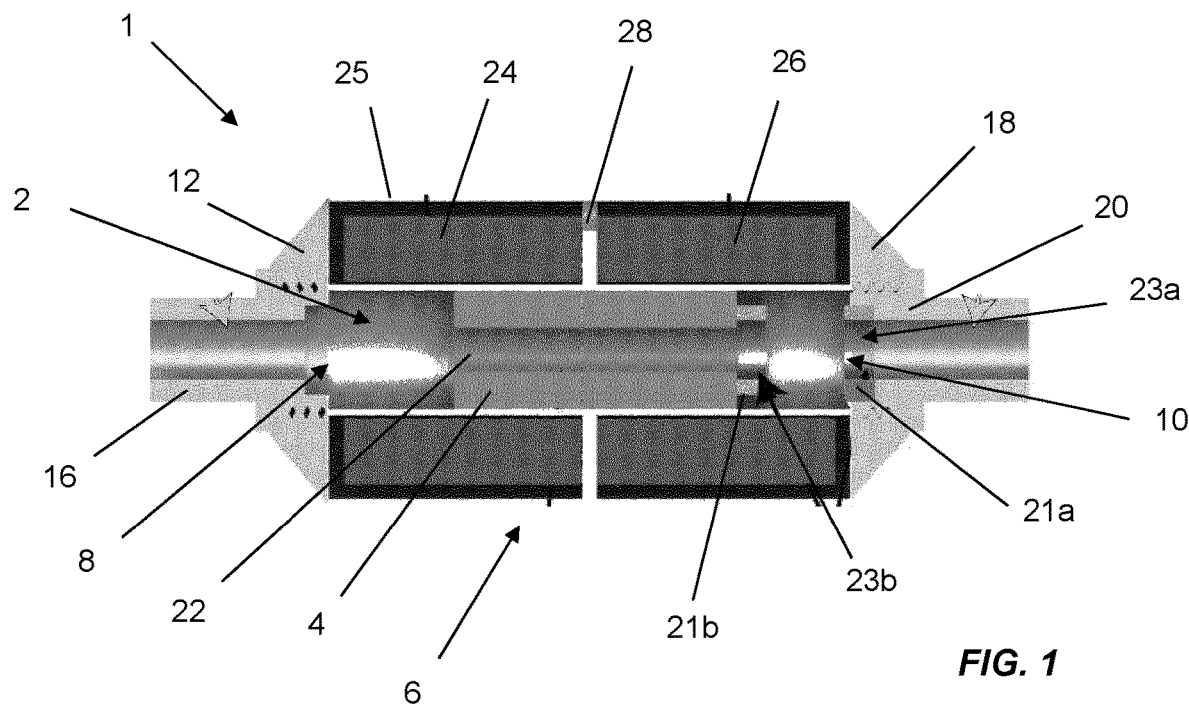
FIG. 1 is a schematic drawing of an electromagnetic flowmeter according to an example embodiment.
Figure 2:
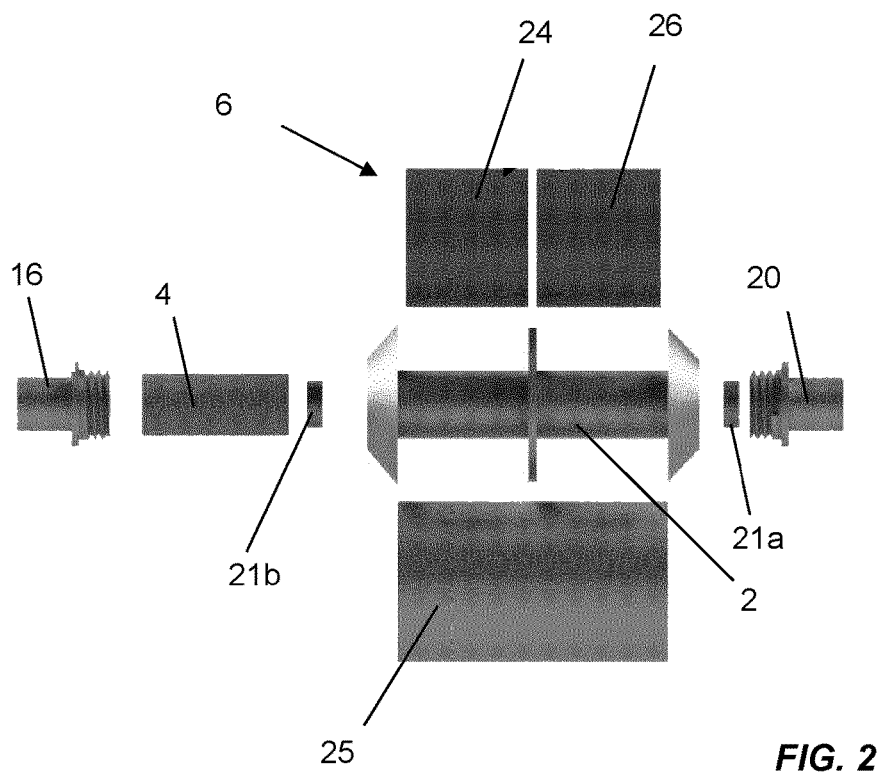
FIG. 2 is an exploded view of the electromagnetic flowmeter of FIG. 1.

Referring to FIGS. 1 and 2 there is shown a flowmeter 1. The flowmeter 1 comprises a conduit 2, a moveable member 4 retained within the conduit 2, and a magnetic field generating unit 6 for generating magnetic fields in the conduit 2. In use, fluid moving through the conduit 2 causes the movable member 4 to move through the conduit accordingly. The moveable member 4 interacts with the magnetic fields. The interaction with the magnetic fields is detectable by monitoring, or measuring, an electrical property of the magnetic field generating unit 6. Movement of the moveable member 4, or lack thereof, can thereby be determined. Properties of the fluid moving through the conduit 2, such as flow speed, flow rate, flux or pressure, can be determined based on the determined movement of the moveable member 4.

The conduit 2 is formed from a corrosion resistant material. The conduit 2 is cylindrical with a circular internal cross-section, although other shapes of conduit 2 and internal cross-section are within the scope of the present invention. The conduit 2 comprises an inlet 8 through which fluid may enter the conduit 2. The conduit 2 further comprises an outlet 10 through which fluid may exit the conduit 2.

An inlet collar 12 extends circumferentially and outwardly from the inlet 8. The inlet collar 12 comprises an internally threaded bore. The internally threaded bore is configured to receive an externally threaded inlet connector 16 of a fluid inflow line. An outlet collar 18 having a similar construction is connected over the outlet 10 at the other end of the conduit 2. The internally threaded bore of the outlet collar 18 is configured to receive an externally threaded outlet connector 20 of a fluid outflow line.

The moveable member 4 is cylindrical and is retained in the conduit 2 with the axis of the cylindrical member 4 coaxial with the axis of the cylindrical conduit 2. The moveable member 4 is configured to move along the axis of the cylindrical conduit 2. The outer diameter of the moveable member 4 is sized such that the member 4 is slidable through the conduit 2. The moveable member 4 comprises a passageway 22 extending therethrough for facilitating a fluid flow through the moveable member 4. The passageway 22 is coaxial with the axis of the cylindrical member 4. Thus, the moveable member 4 has the shape of a right circular hollow cylinder (i.e. a cylindrical shell), with an annular cross-section perpendicular to the axis of the cylinder.

The moveable member 4 is formed from a magnetic material, such as iron or ferrite. Nevertheless, the skilled person will appreciate that the moveable member 4 may be formed from any material which interacts with the magnetic field in a manner which is detectable by monitoring or measuring an electrical property of the magnetic field generating unit 6, such as a change in inductance of the magnetic field generating unit 6 caused by the interaction of the moveable member 4 with the magnetic field.

When fluid flow through the conduit 2 is at or below a threshold level, the moveable member 4 is urged into a rest position within the conduit 2 by biasing members in the form of a pair of opposing permanent magnets 21a, 21b. The first magnet 21a is integrated into the surface of the outlet connector 20 which faces into the conduit 2. The second magnet 21b is provided on the end of the moveable member 4 which is closest to the outlet 10. Each magnet 21a, 21b comprises a passageway 23a, 23b extending therethrough for facilitating the fluid flow through the magnets 21a, 21b.

The biasing members 21a, 21b urge the moveable member 4 toward the inlet 8 of the conduit 2. The inner diameter of the inflow line at the surface of the inlet connector 16 which faces into the conduit 2 is less than the inner diameter of the conduit 2. As a result, when the moveable member 4 is urged into a rest position the moveable member 4 abuts the end of the inlet connector 16. Similarly, at the other end of the conduit 2, if the moveable member 4 is forced to the outlet end by a heavy fluid flow, the moveable member 4 abuts the end of the outlet connector 20 and the magnet 21b integrated therein. Therefore, the moveable member 4 is moveable through the conduit 2 but is retained within it.

Whilst a construction is shown and described in which biasing members 21a, 21b are provided to urge the moveable member 4 toward the inlet 8, the person skilled in the art will readily appreciate that biasing members may be provided at both ends of the moveable member 4 and at both ends of the conduit 2. In such a construction, the moveable member 4 will be urged into a rest position which is an intermediate position along the conduit. Such a construction facilitates the measurement of bi-directional flow. That is, both flow in the direction of inlet to outlet and also outlet to inlet can be measured in a manner consistent with that described herein.

The magnetic field generating unit 6 comprises two coil portions 24, 26 of conducting wire. In this exemplary embodiment, the two coil portions 24, 26 are separate coils (that is, with a separation between the coils), and will be referred to as such herein. Nevertheless, the skilled person will appreciate that the first coil 24 and the second coil 26 could instead be portions of the same continuous coil. The first coil 24 and second coil 26 are coiled around the external surface of the conduit 2 to surround the axis of the cylindrical conduit 2. The lengths of the coils 24, 26 are spatially separated along an axis through the conduit 2. A divider 28 extends outwardly from the outer surface of the conduit between the coils 24, 26. The first coil 24 is located toward the inlet 8 end of the conduit 2, and the second coil 26 is located toward the outlet 10 end of the conduit 2. A cylindrical outer housing 25 extends over the magnetic field generating unit 6 and extends between the inlet collar 12 and outlet collar 18.

Figure 3:
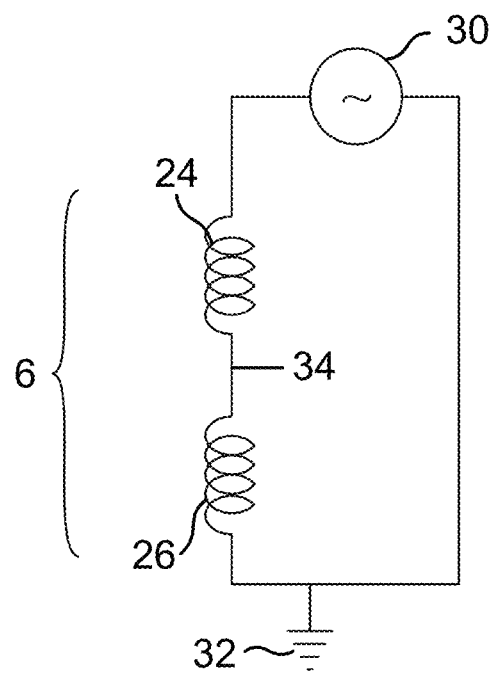
FIG. 3 is a circuit diagram of the electromagnetic flowmeter of FIG. 1.

Referring now to the circuit diagram shown in FIG. 3, the magnetic field generating unit 6 is connected to an AC power supply 30 to supply a lower amplitude, low power, sinusoidal input signal to the coils 24, 26. The circuit is connected to ground 32 to provide a 0V reference. The coils 24, 26 are connected in series. Voltage across the second coil 26 is measured at connection 34, between the coils, with reference to ground 32. In one exemplary embodiment, a differential amplifier is used to drive the circuit, and to provide feedback control from the area of interest.

In use, the AC power supply 30 supplies an alternating current to the coils 24, 26. Each coil 24, 26 generates a magnetic field having field lines extending in the conduit 2. When the current changes direction, each magnetic field tries to oppose the change of direction of the current. The opposition to the changing current induces a voltage across the coils 24, 26. The tendency of the inductor to oppose the change of current is known as inductance. Inductance is defined as the ratio of the voltage induced to the rate of change of the current. The ability of the inductor to oppose the change depends on the magnetic field strength. A greater magnetic field strength induces a greater voltage in opposition to the changing current. The magnetic field strength depends on the magnetic permeability of nearby materials. As described above, the movable member 4 is made from a magnetic material, such as iron or ferrite. Magnetic materials have a high magnetic permeability, which means that when placed in a magnetic field they considerably increase the magnetic field strength. A non-magnetic material could still be used but may lead to less sensitive apparatus.

Returning now to FIGS. 1 and 2, when the moveable member 4 is in the rest position (that is, when the fluid flow through the conduit 2 is at or below a threshold level) the movable member 4 is urged into a position in which it is substantially or wholly within the first coil 24. An increase in the fluid flow sufficient to overcome the bias of the biasing members 21a, 21b urges the moveable member 4 through the conduit 2. The fluid flow urges the member 4 away from (that is, out of) the first coil 24 and simultaneously toward (that is, into) the second coil 26. The presence of the moveable member 4 within the second coil 26 causes an increase in the inductance of the second coil 26, which is detectable as an increase in the voltage measured at connection 34.

In one exemplary embodiment, the voltage across both the first coil 24 and the second coil 26 can be measured simultaneously. The voltages are compared using a differential amplifier. The movement of the moveable member out of the first coil 24 results in a decrease in the inductance of the first coil 24, which is detectable as a decrease in the voltage measured across the first coil 24. This is compared with the simultaneous increase of the voltage measured across the second coil 26 as the moveable member moves into the second coil 26. Improved accuracy and resolution is obtained as the difference between the two signals is compared and amplified.

Figure 4:
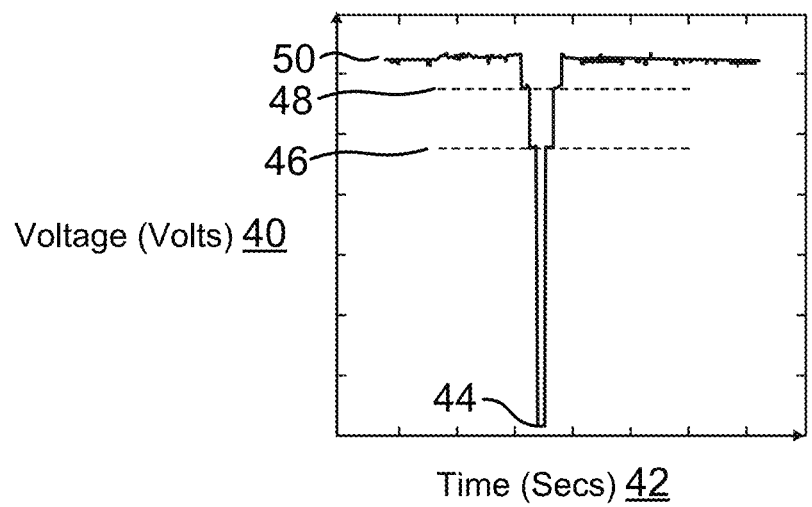
FIG. 4 is a plot of voltage against time for four different flow rates.

Referring now to FIG. 4, the voltage measured at connection 34 (y-axis, indicated at numeral 40) is plotted against time (x-axis, indicated at numeral 42) for four different flow rates 44, 46, 48, 50. For the avoidance of doubt, in this example the flow rate is volumetric flow rate, having units of ml/min. Flow rate 44 was the minimum flow rate tested, which in this example was zero flow through the flowmeter 1. As can be seen in the figure, the voltage 40 decreases as the flow rate is decreased and increases as the flow rate is increased. This is in accordance with the operating principles described above; as the flow rate is decreased the moveable member 4 is urged into the first coil 24 and the induced voltage 40 across the second coil 26 decreases. Conversely, as the flow rate is increased the moveable member 4 is urged into the second coil 26 and the induced voltage 40 across the second coil 26 increases. Advantageously, it can be seen that when the flow rate is reduced from its initial value 50 to zero flow 44 and increased back to its initial value 50, the voltage 40 returns to its initial value. The flowmeter 1 therefore provides a consistent and predictable instrument for characterising fluid flow.

Figure 5:
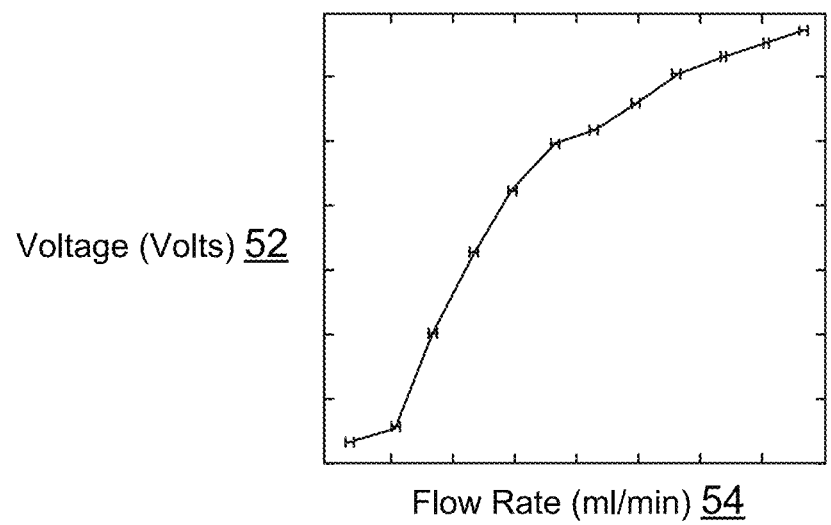
FIG. 5 is a plot of voltage against flow rate.

Referring now to FIG. 5, the voltage measured at connection 34 (y-axis, indicated at numeral 52) is plotted against flow rate (x-axis, indicated at numeral 54). As can be seen in the figure, increasing the flow rate 54 increases the voltage 52. This is in accordance with the operating principles described above; as the moveable member 4 is urged further into the second coil 26 the inductance of the second coil 26 increases as the magnetic permeability of the region within the coil increases. This is detectable as the increase in voltage 52 plotted in the figure.

Figure 6:
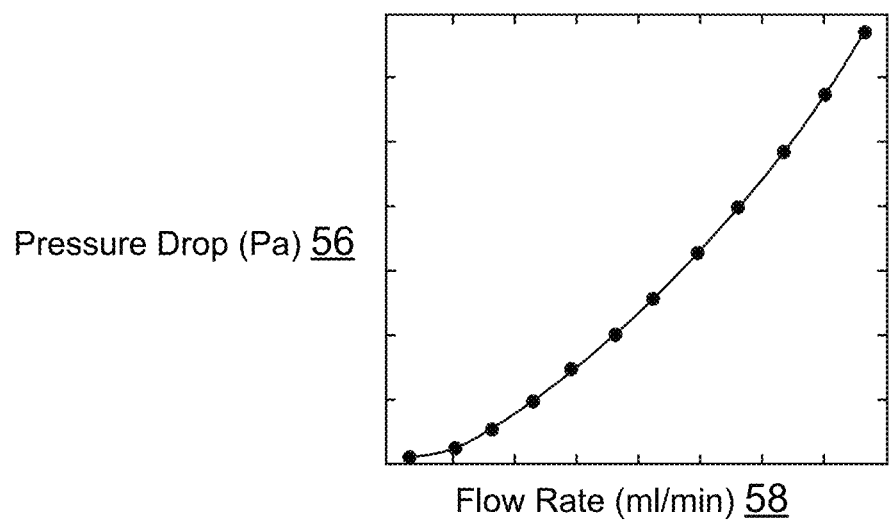
FIG. 6 is a plot of pressure drop across the flowmeter against flow rate.

Referring now to FIG. 6, the pressure drop across the flowmeter 1 (y-axis, indicated at numeral 56) is plotted against flow rate (x-axis, indicated at numeral 58). The relationship between flow rate and pressure drop is stable and predictable, and can therefore be readily accounted for in any calculations in which pressure drop needs to be factored in.

Figure 7:
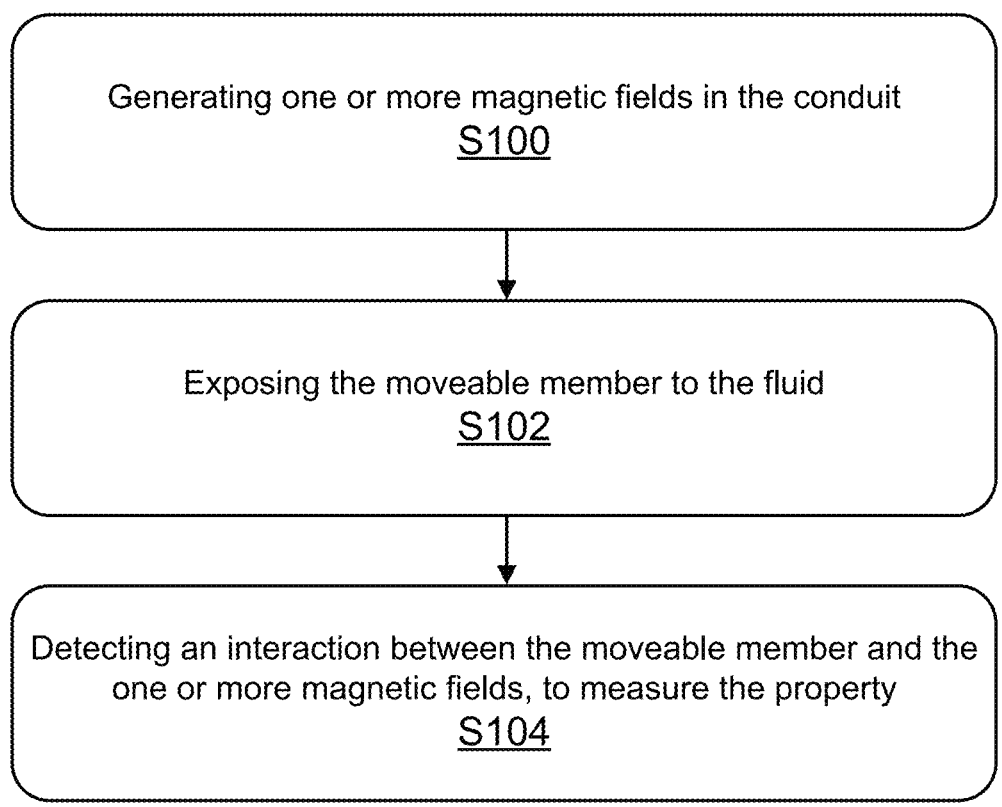
FIG. 7 is a flow diagram of general methodology principles.

In FIG. 7, general methodology principles are shown. The method is a method of measuring a property of a fluid in a conduit, the conduit retaining a moveable member configured to move in accordance with the property of the fluid. Step S100 comprises generating one or more magnetic fields in the conduit. Step S102 comprises exposing the moveable member to the fluid. Step S104 comprises detecting an interaction between the moveable member and the one or more magnetic fields, to measure the property.

In summary, there is provided an apparatus for use in measuring a property of a fluid and method of measuring a property of a fluid in a conduit. The apparatus and method overcome numerous problems with known examples. The apparatus is simple to install and can be placed in-line. The apparatus is simple to calibrate. The apparatus has potential for low cost. The apparatus is highly reliable as it contains few moving parts. The apparatus has a small profile or "footprint". The apparatus is quick to respond to perturbations in the fluid flow as the moveable member 4 moves in direct response to the fluid flow. Any fluid can be used in conjunction with the flowmeter; there is no restriction to conducting fluids.

Although a few preferred embodiments of the present invention have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for use in measuring a property of a fluid, the apparatus comprising:
   a conduit comprising an inlet through which the fluid can enter the conduit, the conduit comprising a first end and a second end;
   a movable member retained within the conduit, the movable member configured to move in accordance with the property of the fluid in the conduit;
   a magnetic field generating unit for generating one or more magnetic fields in the conduit,
   an interaction between the movable member and the one or more magnetic fields being detectable via the magnetic field generating unit, to measure the property of the fluid; and
   one or more magnet pairs for urging the moveable member away from one or both of the first end and the second end of the conduit, a first magnet of a magnet pair of the one or more magnet pairs being provided at the first end or the second end of the conduit, and a second magnet of said magnet pair of the one or more magnet pairs being provided at a corresponding end of the moveable member.

2. An apparatus as claimed in claim 1 wherein the conduit comprises an outlet through which the fluid can exit the conduit.

3. An apparatus as claimed in claim 1 wherein the moveable member comprises a magnetic material.

4. An apparatus as claimed in claim 1 wherein the moveable member comprises a passageway extending therethrough for facilitating a fluid flow through the moveable member.

5. An apparatus as claimed in claim 1 wherein the property of the fluid is determined by measuring an electrical property of the magnetic field generating unit.

6. An apparatus as claimed in claim 5 wherein the electrical property is voltage.

7. An apparatus as claimed in claim 1 wherein the magnetic field generating unit is supplied with an alternating electric current.

8. An apparatus as claimed in claim 1 wherein the conduit comprises an axis along which the movable member is configured to move, and the magnetic field generating unit comprises one or more coils surrounding the axis.

9. An apparatus as claimed in claim 1 wherein the magnetic field generating unit comprises a first coil portion and a second coil portion.

10. An apparatus as claimed in claim 9 wherein each coil portion has a length, and the coil portions are spatially separated along an axis through the conduit such that the length of each coil portion is spatially separated.

11. An apparatus as claimed in claim 9, wherein the property of the fluid is determined by measuring an electrical property of the magnetic field generating unit, and wherein the first coil portion and the second coil portion are connected in series, and the electrical property of the magnetic field generating unit is measured from between the first coil portion and the second coil portion.

12. An apparatus as claimed in claim 9 wherein the movable member is movable away from the first coil portion and simultaneously toward the second coil portion.

13. An apparatus as claimed in claim 9 wherein when the property of the fluid is at or below a first level, the movable member is entirely within one of the first coil portion and the second coil portion.

14. A method of measuring a property of a fluid in a conduit, the conduit comprising an inlet through which fluid can enter the conduit, the conduit comprising a first end and a second end, and the conduit retaining a moveable member configured to move in accordance with the property of the fluid, one or more magnet pairs being configured to urge the moveable member away from one or both of the first end and the second end of the conduit, a first magnet of a magnet pair of the one or more magnet pairs being provided at the first end or the second end of the conduit, and a second magnet of said magnet pair of the one or more magnet pairs being provided at a corresponding end of the moveable member, the method comprising:
   generating one or more magnetic fields in the conduit;
   exposing the movable member to the fluid; and
   detecting an interaction between the moveable member and the one or more magnetic fields, to measure the property of the fluid.

15. An apparatus as claimed in claim 1, wherein the apparatus comprises a first magnet pair and a second magnet pair, the first magnet pair comprising a first magnet at the first end of the conduit and a second magnet at a corresponding end of the moveable member, the second magnet pair comprising a first magnet at the second end of the conduit and a second magnet at a corresponding end of the moveable member, for urging the moveable member away from both the first end and the second end of the conduit.

16. An apparatus as claimed in claim 15, wherein the magnetic generating unit comprises a first coil portion and a second coil portion, and wherein the first magnet pair and the second magnet pair are configured to urge the moveable member into a rest position between the first coil portion and the second coil portion.

* * * * *